Figure 1:
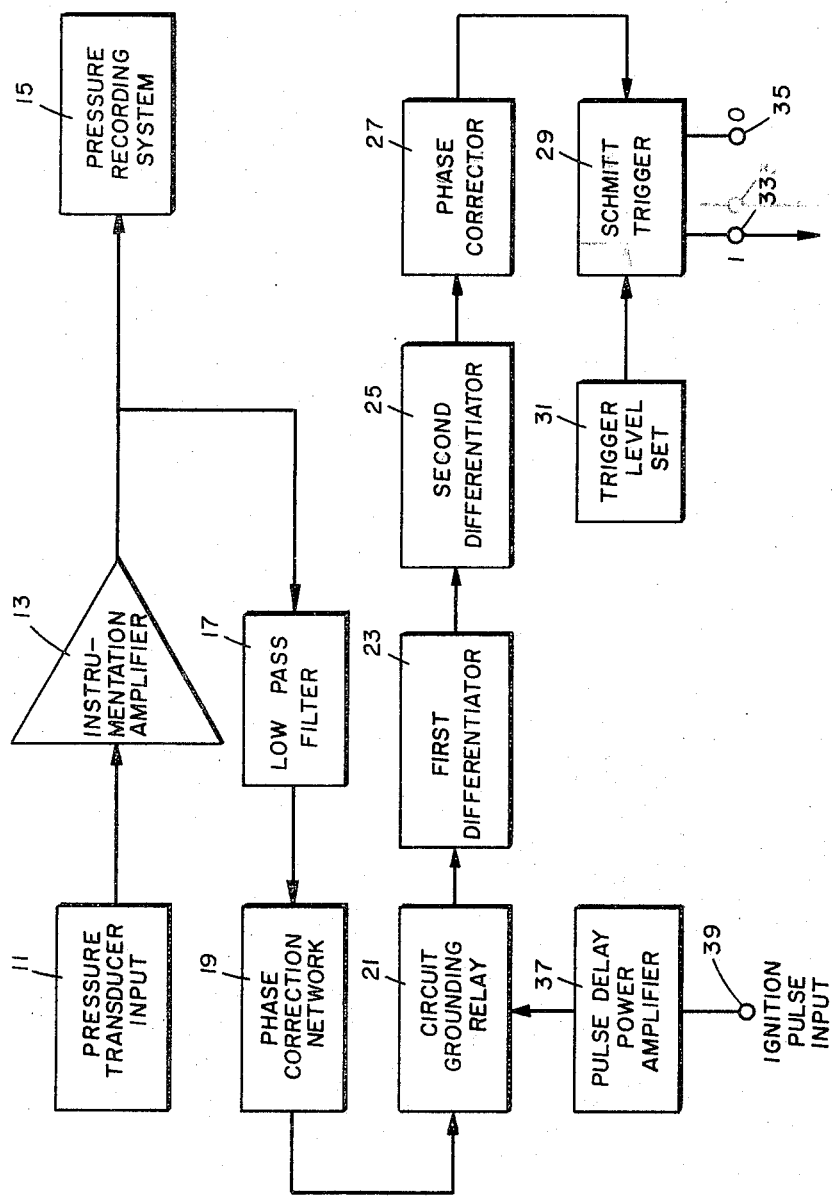

INVENTOR.
Benjamin Z. Meers, Jr.

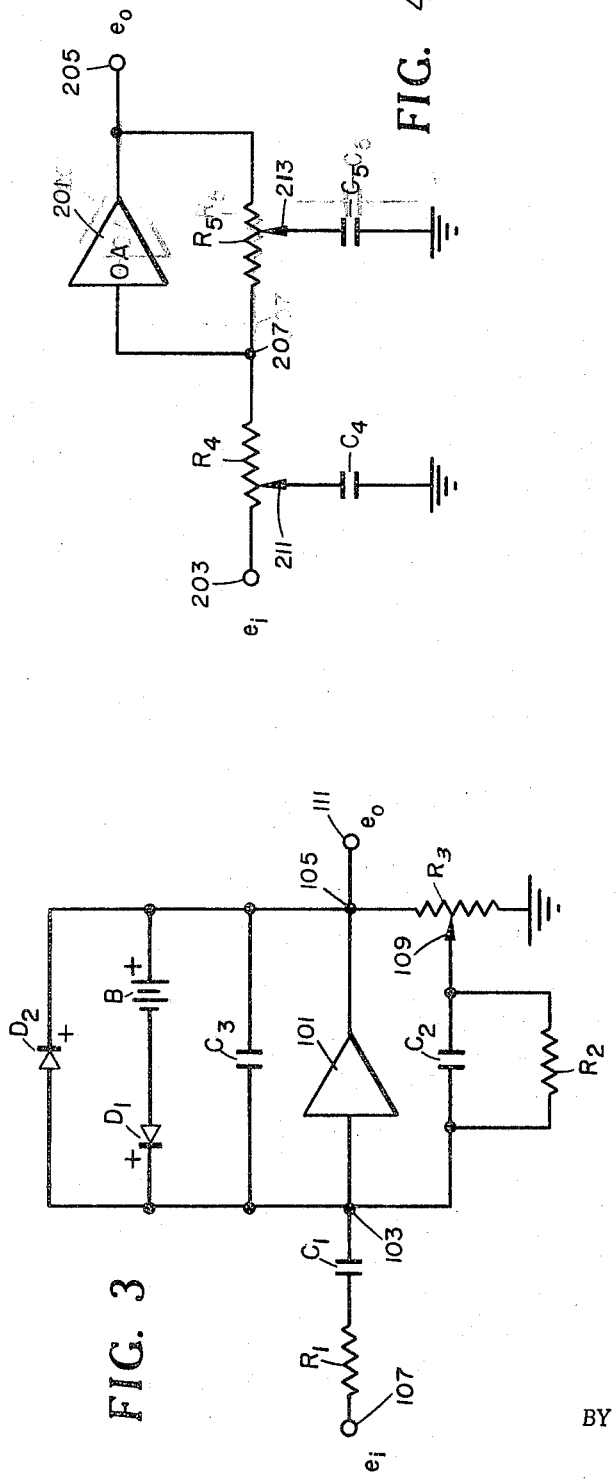
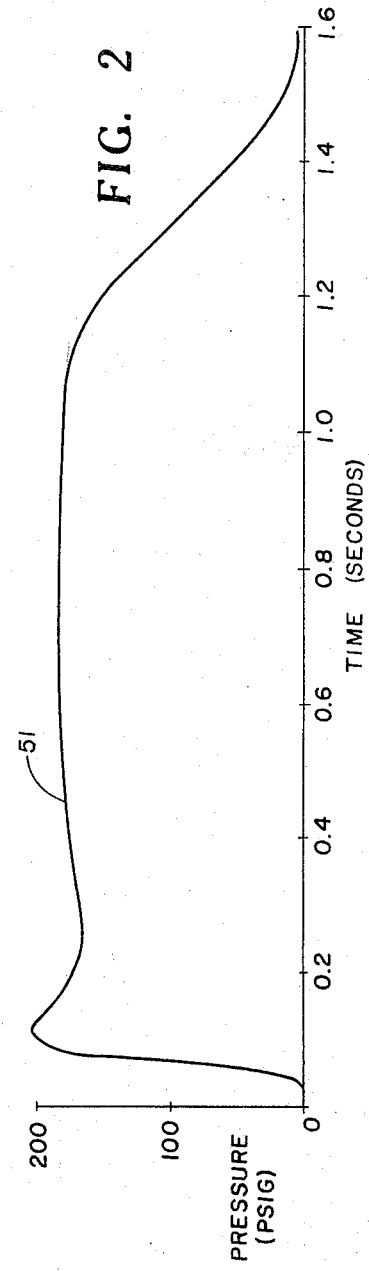

3,303,690
ELECTRONIC SOLID PROPELLANT BURN-UP DETECTOR
Benjamin Z. Meers. Jr., 25 Gabriel Drive, Byrans Road, Md. 20616
Filed Aug. 28, 1964, Ser. No. 392,971
7 Claims. (Cl. 73—35)

The invention described herein may be manufactured and used by or for the Government of the United States of America for governmental purposes without the payment of any royalties thereon or therefor.

This invention relates to apparatus for determining the burn-up time in a solid fuel rocket motor and more particularly to electrical circuitry for determining the second derivative of the pressure within the chamber of a rocket motor.

In determining the burn-up time of a solid propellant in a rocket motor, use is normally made of the fact that the pressure within the rocket motor chamber drops when the fuel within the chamber is burned up. In the past, one of the ways in which the determination of the burn-up time was made was that of graphical analysis. In this graphical analysis a tangent line is constructed which is tangent to the burn-up pressure curve just prior to the burn-up. Then a line is drawn tangent to the pressure curve immediately after burn-up occurs and the angle between those two tangent lines is bisected and a straight line is drawn through this bisection which will intersect the actual pressure curve. A straight line is then erected perpendicular to the time axis of the curve from this intersection and this point on the time axis is known as the burn-up time. This method of determining burn-up is feasible only with graphic analysis as computer analysis becomes complicated and cumbersome. Another disadvantage is that a relatively large time delay is required between the firing and the burn-up time determination, as geometric construction must be made after the burn-up is completed. The accuracy of the determination of the burn-up time is dependent upon the accuracy of the pressure time record and the geometric construction based upon the determination of the slope of the curve after burn-up has occurred.

In this invention the indication and recording of the indication of the burn-up time may be accomplished accurately and substantially instantaneously as the burn-up time occurs. In this invention a pressure transducer is provided within the pressure chamber of a rocket motor to give continuous pressure indications as the rocket fuel within the combustion chamber is being burned. The output signals from the pressure transducer are passed through amplifying means through a low pass filter and successively through two differentiators and the second derivative of the pressure within the rocket motor chamber is applied to a trigger circuit. The output voltage of a pressure transducer is also applied to a pressure recorder.

It is an object of this invention to provide means for accurately determining the burn-up time of a solid propellant within a rocket motor.

It is another object of this invention to provide means for indicating and recording the burn-up time of a solid fuel propellant within a rocket motor by applying the second derivative of the pressure drop within the pressure chamber of a rocket motor to a trigger circuit.

It is a further object of this invention to provide an electrical differentiating circuit for indicating the second derivative of the pressure within a rocket motor chamber.

It is still another object of this invention to provide automatic and instantaneous electronic burn-up time of a solid propellant grain.

It is still another object of this invention to provide a burn-up indication of a solid fuel propellant.

Other objects and many of the attendant advantages of this invention will be readily appreciated as the same becomes better understood by reference to the following detailed description when considered in connection with the accompanying drawings wherein:

FIG. 1 is a diagram of the electronic circuit of this invention;

FIG. 2 of the drawing is a graphical illustration of the pressure curve of the pressure within a rocket chamber;

FIG. 3 of the drawings is a circuit illustrating a differentiator of this invention; and FIG. 4 of the drawings is a circuit illustrating a phase corrector of the instant invention.

Referring now to FIG. 1 of the drawings in which the diagram of the electronic circuitry of this invention is illustrated, a pressure transducer 11 which is actually mounted within the pressure chamber of a rocket motor, not shown, has an electrical output which is connected to instrumentation amplifier 13. The output from the instrumentation amplifier 13 is fed to a pressure recording system 15 where the pressures within the combustion chamber of the rocket motor may be recorded. The electrical output from transducer 11 is also fed to low pass filter 17. The output from the low pass filter is fed into phase correction network 19 wherein phase may be corrected to compensate for distortions caused by the low pass filter 17. The output from the phase correction network 19 is fed to the circuit grounding relay 21 and then the output of the circuit grounding relay is fed to a first differentiator 23. The output of first differentiator 23 is then applied to the input circuit of the second differentiator 25. The output of the second differentiator 25 is fed to the phase corrector 27 and then to one input terminal of a trigger circuit such as a Schmitt trigger circuit 29. A trigger level set circuit is also connected to an input of the trigger circuit 29. The output of the Schmitt trigger circuit 29 comprises a "1" state terminal 33 and a "0" state terminal 35. The circuit grounding relay is also connected to a pulse delay power supply 37 which is connected to an ignition pulse input terminal 39.

Referring now to FIG. 2 of the drawings the curve 51 of the variation of the pressure within the combustion chamber of the rocket motor is shown with respect to time. The pressure is shown in pounds per square inch gauge and time is shown in seconds.

Referring to FIGS. 1 and 2 of the drawings for the operation of the electronic circuit of this invention, any electrical voltage proportional to the pressure within combustion chamber of the rocket motor will be produced at the output of pressure transducer 11. This voltage is amplified in instrumentation amplifier 13 and applied to the pressure recording system 15 and to low pass filter 17. The instantaneous pressure within the combustion chamber of the rocket motor may be continuously recorded in the pressure recording system 15 to record pressure changes as shown in FIG. 2 of the drawings. At the same time a portion of the amplified signal from instrumentation amplifier 13 is applied to low pass filter 17. Low pass filter 17 will eliminate any noise which may cause a false indication of the burn-up time. Any phase shift which is introduced by the filter is corrected by the phase correction network 19 as the signal passes through this network. The low pass filter and phase correction network are designed so that the pressure signal may be grounded by means of circuit grounding relay 21 without excessive loading of instrumentation amplifier 13. The grounding circuit relay 21 is used to short the output of the phase correction network 19 until shortly after the ignition pulse is applied to the propellant grain. To accomplish this result, the ignition pulse is delayed a predetermined length of time by a pulse delay power amplifier 37. The ignition pulse applied at terminal 39 of pulse delay power amplifier 37 is delayed by a predetermined length of time and then it is applied to circuit grounding relay 21 to open the relay and remove the short circuit from the input of the first differentiator 23. As long as the pressure in the combustion of rocket motor is constant or falling off slowly at a steady rate the voltage from the second differentiator circuit will be zero. When a significant drop in pressure occurs, the first derivative of this pressure drop will appear at the output of first differentiator 23 and the second derivative of this voltage drop will occur at the ouput of second differentiator 25. The output of second differentiator 25 represents the second derivative of the pressure drop in the motor chamber. The electronic circuit shown in FIG. 3 of the drawings functions as a conventional differentiator with the following exceptions as explained hereinafter.

The second derivative of the chamber pressure decrease is applied to the phase corrector 27 which is an adjustable lead-lag circuit using an operational amplifier as shown in FIG. 4 of the drawings. Its purpose is to correct objectionable phase errors introduced by inaccuracies of the differentiator circuits. The corrected leading edge of the second derivative is again differentiated by the input circuit of the Schmitt trigger 29. This sharp input pulse of positive polarity causes the Schmitt trigger to fire at a level determined by the trigger level set control 31. A "1" output of the Schmitt trigger at terminal 33 indicates that the burn-up of the propellant test motor has occurred. The Schmitt trigger is automatically reset by the trailing edge of the triggering pulse.

Referring now to FIG. 3 of the drawings a typical differentiator circuit 23 is shown which may be used as a first differentiator 23 in FIG. 2 of the drawings. In this differentiator circuit an operational amplifier 101 is provided with an input terminal 103 and an output terminal 105. An input voltage $e_i$ as applied to input terminal 103 through serially connected resistor $R_1$ and capacitor $C_1$. Parallel connected capacitor $C_2$ and resistor $R_2$ are connected between terminal 103 and a movable tap 109 of resistor $R_3$. Resistor $R_3$ is connected between terminal 105 and ground potential. A capacitor $C_3$ is connected between the input terminal 103 of operational amplifier 101 and the output terminal 105 of operational amplifier 101. A diode $D_1$ is connected in series with a D.-C. voltage source such as battery B is connected across terminals 103 and 105. A second diode $D_2$ is also connected across terminals 103 and 105. The output voltage of the circuit $e_o$ will appear at output terminal 111.

A differentiator for the second differentiating circuit 25 of FIG. 1 of the drawings may be a circuit similar to that shown in FIG. 3 except that diodes $D_1$ and $D_2$ as well as battery B are all reversed in polarity. Components $R_1$, $C_2$ and $C_3$ have the effect of reducing noise and instability which are normally inherent in differentiating circuits. Diode $D_1$ and voltage source B form a clipping circuit which provides maximum feedback at the operational amplifier input terminal 103. This prevents the operational amplifier from being overloaded on sudden transient pressure changes in the rocket motor. Diode $D_2$ provides maximum negative feedback of the input of the operational amplifier 101 for all positive pressure changes above a very low value determined by the forward breakdown voltage of the diode $D_2$. This prevents any significant positive pressure changes from appearing at the output of the system. The overall gain and amount of integration of high frequency noise is controlled by a moveable tap on resistor $R_3$ or potentiometer. This allows the differentiator to be operated from unity gain to a gain which is much greater than unity while simultaneously controlling the noise level.

Referring now to FIG. 4 of the drawings a phase corrector such as may be used as phase corrector 27 of FIG. 1 of the drawings is shown as a modified operational amplifier circuit having an operational amplifier 201. Operational amplifier 201 has an input terminal 207 and an output terminal 205. A voltage $e_i$ may be applied to terminal 203 and an output voltage $e_o$ may be applied from output terminal 205. The input terminal 207 of operational amplifier 201 is connected to the input terminal 203 through resistance $R_4$ having a movable tap 211. A capacitor $C_4$ is connected between movable tap 211 and ground potential. A resistor $R_5$ is connected between input terminal 207 of operational amplifier 201 and output terminal 205 of operational amplifier 201. A capacitor $C_5$ is connected between movable tap 213 and a ground potential. This phase corrector circuit is a simple adjustable lead like network utilizing operational amplifier 201 as shown and its purpose is to correct for any objectionable phase errors introduced by inaccuracies in the differentiator circuits.

The operation of this invention is based upon the changes of chamber pressure in the rocket motor at the instant of burn-up. The chamber pressure before burn-up is relatively constant, whereas immediately after burn-up, the chamber pressure is given by the following equation:

$$P - P_0 \varepsilon^{-\left[\frac{K_d C_d A_t R T}{MV}(\Delta t)\right]}$$

where:
P is the chamber pressure after burn-up
$P_0$ is the chamber pressure at burn-up
$C_d$ is the nozzle efficiency factor
$A_t$ is the throat area of the nozzle
R is the universal gas constant
T is the flame temperature
M is the gas molecular weight
V is the chamber free volume at burn-up
$\Delta t$ is the time after burn-up
$\varepsilon$ is the base of the natural logarithm.

This is the ideal case where burn-up is defined by the discontinuity at the transition between burning pressure and the pressure as expressed by the above-stated pressure exhaust equation. In a real motor, there is no discontinuity that is the transition is a sudden but smooth decrease in pressure followed by a pressure represented by the pressure exhaust equation.

Obviously, many modifications and variations of the present invention are possible in the light of the above teachings. It is therefore to be understood that within the scope of the appended claims the invention may be practiced otherwise than specifically described.

What is claimed is:
1. An electronic circuit for indicating the burn-up time of a solid fuel propellant in the combustion chamber of a rocket motor comprising,
    a pressure transducer within the combustion chamber of a rocket motor and having an electrical output circuit,
    amplifier means,
    pressure recording means,
    means connecting the output circuit of said pressure transducer to an input circuit of said amplifier means,
    means connecting an output circuit of said amplifier means to an input circuit of said pressure recording means,
    means connecting said output of said amplifier means to an input circuit of a filter means,
    phase correction network,
    means connecting an output circuit of said filter to an input circuit of said phase correction network,
    a grounding relay having a pair of normally opened contacts,
    a first input circuit,
    a second input circuit,
    an output circuit, a pulse delay amplifier means having an input circuit and an output circuit, means connecting the input circuit of said pulse delay amplifier to an ignition pulse source of said rocket motor, means connecting the output circuit of said pulse delay amplifier to said second input circuit of said grounding relay, means connecting the output of said phase correction network to the first input of said grounding relay, means connecting the output circuit of said grounding relay to an input circuit of a first differentiator, means connecting an output circuit of said first differentiator to an input circuit of a second differentiator, means connecting an output circuit of said second differentiator to an input circuit of a phase corrector, means connecting the output circuit of said phase corrector to a first input circuit of a trigger circuit, trigger level set means, means connecting said trigger level set means to a second input circuit of said trigger whereby an output pulse is produced from said trigger when a second derivative of the pressure transducer is produced due to a drop in pressure at the point of burn-up in the rocket chamber.

2. Electronic apparatus for determining the instant of burn-up of a solid fuel in the combustion chamber of a rocket motor comprising:

a pressure transducer located within the combustion chamber of a rocket motor, first differentiator means, second differentiator means, a trigger circuit, amplifier means connecting the output of said transducer to the input of said first differentiator, means connecting the output of said first differentiator to the input of said second differentiator, means connecting the output of said second differentiator to a first input of said trigger circuit, a trigger level set connected to a second input of said trigger circuit whereby a pressure change from said pressure transducer will produce a second derivative of said voltage change in the output circuit of said second differentiator whereby a voltage pulse may appear at the output of said trigger circuit at the time of burn-up of a solid fuel propellant of the rocket motor.

3. Apparatus for instantaneously indicating the burn-up time of a solid fuel propellant in the combustion chamber of a rocket motor comprising, a pressure transducer mounted within the combustion chamber, said transducer having an electrical voltage output proportional to the pressure within said chamber, amplifier means having an input circuit and an output circuit, a recorder having an input circuit, a grounding means having a first input circuit, a second input circuit, and an output circuit, said first input circuit being at ground potential when no signal is applied to the second input circuit of said grounding means, and said first circuit being connected to the output circuit when a signal is applied to said second input circuit, a pulse delay power amplifier having an output circuit connected to the second input circuit of said grounding means, a first differentiator having an input circuit and an output circuit, a second differentiator having an input circuit and an output circuit, means connecting the output circuit of said amplifier to the first input circuit of said grounding means, means connecting the output circuit of said amplifier to the input circuit of said recorder, means connecting the input circuit of said pulse power amplifier to an ignition circuit of said rocket motor, means connecting the output circuit of said pulse delay power amplifier to the second input circuit of said grounding means, means connecting the output circuit of said grounding means to the input circuit of said first differentiator, means connecting the output circuit of said first differentiator to the input circuit of said second differentiator, means connecting the output circuit of said second differentiator to a trigger circuit whereby a voltage pulse may be produced when a significant change in the pressure of said combustion chamber occurs.

4. Apparatus as in claim 3 wherein said means connecting the output circuit of said amplifier to the input of said grounding means includes a low pass filter and a phase correction network and wherein said means connecting the output circuit of said second differentiator to said trigger circuit includes a phase corrector.

5. Apparatus for detecting the burn-up time of a solid fuel rocket propellant within the combustion chamber of a rocket motor comprising, a pressure transducer within the combustion chamber of said rocket motor, said transducer having an electrical output circuit which provides a voltage output proportional to the pressure within said combustion chamber, a first electronic differentiator having an input circuit and an output circuit, a second electronic differentiator having an input circuit and an output circuit, trigger means having an input circuit and an output circuit, means adjusting the operating level of said trigger means, means connecting the electrical output of said transducer to the input circuit of said first differentiator, means connecting the output circuit of said first differentiator to the input circuit of said second differentiator, means connecting the output circuit of said second differentiator to the input circuit of said trigger means whereby a voltage may be produced at the output circuit of said trigger means when the pressure within said chamber drops significantly.

6. Apparatus as in claim 5 wherein said means for connecting said pressure transducer electrical output circuit to said input circuit of said first differentiator includes a circuit grounding relay, said circuit grounding relay having a first contact connected to a ground potential, a second contact connected to said electrical output circuit and a third contact connected to the input circuit of said first differentiator, said first and second contacts being connected when said relay is not energized and said second and third contacts being connected when said relay is energized, energizing means connected to said relay and to a source of ignition pulses from said rocket motor.

7. Apparatus as in claim 6 in which said energizing means includes a pulse delay and power amplifier.

No references cited.

RICHARD C. QUEISSER, *Primary Examiner.*

J. J. GILL, *Assistant Examiner.*